US012670808B2

(12) United States Patent
Nakamura et al.

(10) Patent No.: US 12,670,808 B2
(45) Date of Patent: Jun. 30, 2026

(54) AMBIENT ENVIRONMENT INFORMATION TRANSMISSION DEVICE

(71) Applicant: Raise the Flag Co., Ltd., Takamatsu (JP)

(72) Inventors: Takeshi Nakamura, Takamatsu (JP); Masakazu Shinohara, Takamatsu (JP)

(73) Assignee: Raise the Flag Co., Ltd., Takamatsu (JP)

( * ) Notice: Subject to any disclaimer, the term of this patent is extended or adjusted under 35 U.S.C. 154(b) by 346 days.

(21) Appl. No.: 18/552,210

(22) PCT Filed: Dec. 16, 2021

(86) PCT No.: PCT/JP2021/046533
§ 371 (c)(1),
(2) Date: Sep. 25, 2023

(87) PCT Pub. No.: WO2022/209043
PCT Pub. Date: Oct. 6, 2022

(65) Prior Publication Data
US 2024/0177627 A1 May 30, 2024

(30) Foreign Application Priority Data
Mar. 30, 2021 (JP) ................................. 2021-057159

(51) Int. Cl.
*G09B 21/00* (2006.01)
*G01C 3/08* (2006.01)
(Continued)

(52) U.S. Cl.
CPC ............. *G09B 21/006* (2013.01); *G01C 3/08* (2013.01); *G06F 3/013* (2013.01); *G06F 3/016* (2013.01);
(Continued)

(58) Field of Classification Search
CPC .. G09B 21/007; G09B 21/006; G09B 21/003; G06T 7/70; G06V 30/19; G01C 3/08; G06F 3/013; G06F 3/16
See application file for complete search history.

(56) References Cited

U.S. PATENT DOCUMENTS 6,738,130 B1 * 5/2004 Chen ......................... G01C 3/04
356/5.1
8,449,401 B2 * 5/2013 Kayama ................... G02C 7/16
351/45

(Continued)

FOREIGN PATENT DOCUMENTS

| JP | 2001-318594 A | 11/2001 |
| JP | 2016-194612 A | 11/2016 |
| JP | 2019-159193 A | 9/2019 |

OTHER PUBLICATIONS

The extended European search report of the corresponding EP application No. 21935192.1 mailed Jan. 27, 2025.

*Primary Examiner* — Steve Rowland
(74) *Attorney, Agent, or Firm* — Muncy, Geissler, Olds & Lowe, P.C.

(57) ABSTRACT

[Problem] Provided is an ambient environment information transmission device capable of quickly and accurately transmitting ambient environment information to a visually impaired person. [Solution] An ambient environment information transmission device 1 includes a body 10 that is configured to be worn by a user, a distance image capturing unit 20 that is supported by the body 10 and that is configured to capture a distance image ahead of the user, a line-of-sight direction detection unit 22 that is supported by the body 10 and that is configured to detect a line-of-sight direction of the user, a control unit 40 that is configured to obtain distance information on a target portion in the line-of-sight direction in the distance image, and distance infor- (Continued)

mation output units 30, 32, 34 that are configured to output the distance information through sound or tactile sensation.

12 Claims, 4 Drawing Sheets

(51) Int. Cl.
   *G06F 3/01*        (2006.01)
   *G06T 7/70*        (2017.01)
   *G06V 30/19*       (2022.01)

(52) U.S. Cl.
   CPC ................ *G06T 7/70* (2017.01); *G06V 30/19* (2022.01); *G09B 21/003* (2013.01)

(56)                References Cited

U.S. PATENT DOCUMENTS 8,559,646  B2 *  10/2013  Gardner .................. H04M 3/56
                                                      381/310
   11,579,471  B2 *   2/2023  Ma ......................... G02C 11/10

| | | | | |
|---|---|---|---|---|
| 2005/0111097 | A1 * | 5/2005 | Iannarelli ............. | G02B 25/004 |
| | | | | 359/407 |
| 2011/0216179 | A1 * | 9/2011 | Dialameh .............. | G06V 10/17 |
| | | | | 348/E7.085 |
| 2012/0236030 | A1 * | 9/2012 | Border .................... | G06F 3/013 |
| | | | | 345/633 |
| 2012/0327389 | A1 * | 12/2012 | Tregellas ................. | G01C 3/04 |
| | | | | 356/3 |
| 2013/0144778 | A1 * | 6/2013 | Jo ........................... | G01S 19/19 |
| | | | | 473/409 |
| 2015/0057107 | A1 * | 2/2015 | Leech .................... | A63B 69/36 |
| | | | | 701/523 |
| 2015/0070649 | A1 * | 3/2015 | Mingo ............... | G02B 27/0172 |
| | | | | 351/158 |
| 2016/0187654 | A1 * | 6/2016 | Border .............. | G02B 27/0172 |
| | | | | 359/630 |
| 2017/0287360 | A1 * | 10/2017 | Subramaniam ...... | G09B 21/006 |
| 2019/0261112 | A1 * | 8/2019 | Norris .............. | H04M 1/72457 |
| 2019/0371028 | A1 * | 12/2019 | Harrises ............ | G02B 27/0101 |
| 2021/0132689 | A1 * | 5/2021 | Yudanov .............. | G06F 3/0488 |
| 2025/0342723 | A1 * | 11/2025 | Edwin ...................... | G06T 7/73 |

* cited by examiner

| 20 | DISTANCE IMAGE CAPTURING UNIT | | | 40 | DISTANCE INFORMATION OUTPUT UNIT (RIGHT SIDE) | 30 |
| 22 | LINE-OF-SIGHT DIRECTION DETECTION UNIT | | CONTROL UNIT | | DISTANCE INFORMATION OUTPUT UNIT (CENTER) | 32 |
| 24 | PROJECTION UNIT | | | | DISTANCE INFORMATION OUTPUT UNIT (LEFT SIDE) | 34 |
| 26 | ULTRASONIC TRANSDUCER | | | | | |

(a)          (b)          (c)          (d)          (e)

(a)          (b)          (c)          (d)          (e)

AMBIENT ENVIRONMENT INFORMATION TRANSMISSION DEVICE

TECHNICAL FIELD

The present invention relates to an ambient environment information transmission device, and particularly relates to an ambient environment information transmission device suitable for use by a visually impaired person.

BACKGROUND ART

As a device capable of transmitting ambient environment information to a user, Patent Literature 1 discloses an activity assistance device for a visually impaired person. In this device, a distance image capturing unit supported by a body to be worn by a user captures a distance image ahead of the user, and a calculation unit calculates distance information on an obstacle included in the distance image, thereby transmitting the distance information to the user through sound or vibration. The calculation unit divides an area of the distance image into a central portion and a peripheral portion. The calculation unit calculates peripheral distance information, which is distance information on an obstacle included in the peripheral portion, as information that changes in a stepwise manner. Meanwhile, the calculation unit calculates central distance information, which is distance information on an obstacle included in the central portion, as information that changes in a more stepwise manner, as compared with the change in the peripheral distance information, or successively.

CITATION LIST

Patent Literature

Patent Literature 1: JP 2019-159193 A

SUMMARY OF INVENTION

Technical Problem

The device disclosed in Patent Literature 1 allows the user to briefly grasp a distance to an obstacle surrounding the user by using the peripheral distance information, and also allows the user, when the user turns the user's face toward a direction of interest, to grasp a detailed distance by using the central distance information. However, there is a case in which a user, a usage situation, or the like may require a quicker grasp of ambient environment information, and there has been a need for a device adaptable to such a purpose.

It is therefore an object of the present invention to provide an ambient environment information transmission device capable of quickly and accurately transmitting ambient environment information to a visually impaired person.

Solution to Problem

The object of the present invention is achieved by an ambient environment information transmission device including: a body configured to be worn by a user; a distance image capturing unit supported by the body, the distance image capturing unit being configured to capture a distance image ahead of a user; a line-of-sight direction detection unit supported by the body, the line-of-sight direction detection unit being configured to detect a line-of-sight direction of a user; a control unit configured to obtain distance information on a target portion in the line-of-sight direction in the distance image; and a distance information output unit configured to output the distance information through sound or tactile sensation.

In the ambient environment information transmission device, the control unit is preferably configured to cause level difference information to be output from the distance information output unit, when a change in the distance information along with movement of the line-of-sight direction exceeds a reference value.

A plurality of the distance information output units is preferably provided in a left-right direction of a user, and the control unit is preferably configured to localize output from the plurality of the distance information output units in the line-of-sight direction.

A projection unit is preferably further provided that is supported by the body, and that is configured to project pattern light ahead of a user.

An ultrasonic transducer is preferably further provided that is supported by the body, and that is configured to transmit and receive an ultrasonic wave to and from a side ahead of a user. The control unit can obtain the distance information on the target portion in the line-of-sight direction, based on detection performed by the ultrasonic transducer.

A character information image-capturing unit is preferably further provided that is configured to capture an image of character information provided on an object in an image capturing area of the distance image capturing unit. In addition, a character information output unit is preferably further provided that is configured to output the character information through sound or tactile sensation. The control unit can set a reading area in an image capturing area of the character information image-capturing unit based on the distance information in the line-of-sight direction, and cause character information included in the reading area to be output from the character information output unit.

Advantageous Effects of Invention

According to the present invention, it is possible to provide an ambient environment information transmission device capable of quickly and accurately transmitting ambient environment information to a visually impaired person.

DESCRIPTION OF EMBODIMENTS

Figure 1:
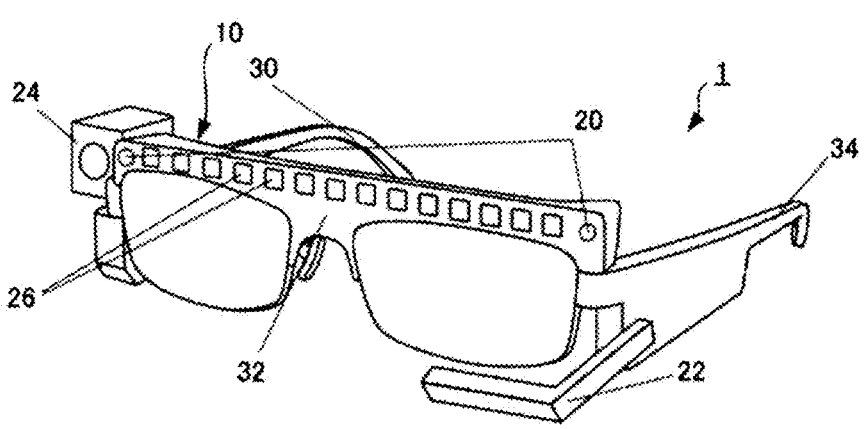
FIG. 1 is a perspective view of an ambient environment information transmission device according to an embodiment of the present invention.
Figure 2:
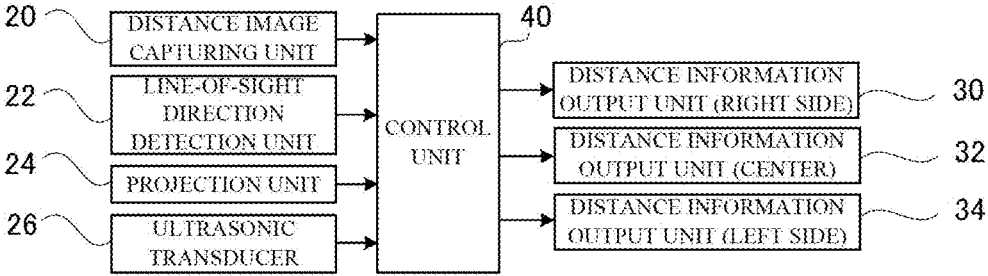
FIG. 2 is a block diagram of the ambient environment information transmission device illustrated in FIG. 1.

Hereinafter, embodiments of the present invention will be described with reference to the accompanying drawings. FIG. 1 is a perspective view of an ambient environment information transmission device according to an embodiment of the present invention, and FIG. 2 is a block diagram thereof. As illustrated in FIGS. 1 and 2, an ambient environment information transmission device 1 includes a distance image capturing unit 20, a line-of-sight direction detection unit 22, a projection unit 24, ultrasonic transducers 26, distance information output units 30, 32, 34, and a control unit 40 as main components, which are configured by being supported by a body 10.

The body 10 has a form of eyeglasses to be worn on the face of a user. The body 10 is not particularly limited as long as it has a configuration that allows the user to wear it. However, the body 10 preferably has a configuration that allows a position or a direction thereof to be specified to some extent at the time of wearing to hardly cause displacement in the position or change in the direction after the wearing. Examples of the form of the body 10 can include a cap, an outerwear garment, a belt, and a mask, in addition to eyeglasses.

The distance image capturing unit 20 is, for example, a stereo camera, and is supported on both left and right sides of the front of a rim portion 10a of the body 10 to capture an image ahead of the user in a state where the body 10 is worn by the user. The distance image capturing unit 20 is not particularly limited as long as it has a configuration that enables acquisition of a two-dimensional distance image having per-pixel distance information. In addition to the stereo camera, the distance image capturing unit 20 may be, for example, a time-of-flight (TOF) camera, a monocular camera, or the like, or may be a combination thereof. In a case where the distance image capturing unit 20 is formed as a stereo camera, a distance image can be acquired only by one of cameras included in the stereo camera using motion parallax or the like, even if the other camera included in the stereo camera is subjected to failure or the like to fail to acquire the distance image.

The view angle and the resolution of the distance image capturing unit 20 are not particularly limited. However, each of the range of the view angle and the range of the resolution is preferably secured to a degree necessary for the user's activities such as daily life activities. The view angle is, for example, 140 to 160 degrees in the left-right direction, and 112 to 128 degrees in the vertical direction. The resolution of the distance image is, for example, 1280×1024 px, and a bit depth is preferably 10 bits or more. A dynamic range is preferably, for example, 100 dB or more to allow the distance image to be reliably acquired at a wide variety of brightness levels ranging from a very bright environment, such as an environment under sunlight, to a night environment. The spatial resolution of the distance image is preferably secured to be about 10 cm at 5 m away, and a lens of the distance image capturing unit 20 may be appropriately designed to allow the distance image to have a central portion whose resolution is higher than that of its edge portion.

The line-of-sight direction detection unit 22 is supported at a lower portion of the body 10. This configuration allows the line-of-sight direction detection unit 22 to capture an image of one eye of the user by using a visible light camera, an infrared camera, or the like, and thus to detect a line-of-sight direction from the orientation of the eyeball. A method of detecting the line-of-sight direction is not particularly limited. In addition to a corneal reflection method, another known method may be used such as a search coil method, an electrooculography (EOG) method, or a limbus tracking method. The line-of-sight direction detection unit 22 may be arranged to be able to capture an image of both eyes, to detect a line-of-sight direction from the lines of sight of both eyes.

The projection unit 24 is supported on the right side of the rim portion 10a of the body 10 to be able to project pattern light, such as light with a pattern of random dots, ahead of the user. Even in a case where an object has no luminance difference on its surface, projection of the pattern light from the projection unit 24 can create a luminance difference. Thus, the distance image capturing unit 20 can accurately acquire a distance image. The pattern light projected from the projection unit 24 may be visible light, but is preferably infrared light (for example, infrared light having a wavelength of 940 nm). The pattern light formed of infrared light has a steep peak in an absorption spectrum brought by atmospheric absorption, high power efficiency, and a wavelength capable of reducing disturbance light. Thus, the pattern light formed of infrared light can reduce an adverse effect, due to direct visual contact or damage caused by light. A configuration in which the projection unit 24 is not provided may be adopted, in a case where projection of pattern light is unnecessary, such as a case where a TOF camera is used as the distance image capturing unit 20.

The ultrasonic transducers 26 transmit and receive ultrasonic waves to and from the side ahead of the user to measure a distance to a target object. The ultrasonic transducers 26 are arranged in a plural manner to be aligned in the left-right direction on the front of the rim portion 10a of the body 10. The ultrasonic transducers 26 are driven by a phased array method, whereby a wide-range distance information can be obtained. The wide-range distance information can be quickly obtained by changing, along with time, the frequency of the ultrasonic waves transmitted from the ultrasonic transducers 26 within a band in use (for example, 40 to 80 kHz), and by performing filtering to receive only a reflection signal whose frequency matches a corresponding transmission signal. There may be a case in which the ultrasonic transducers 26 are not able to be driven by the phased array method due to a change in the surrounding situation, breakage of a part of the ultrasonic transducers 26, or the like, or a case in which it is determined that it is difficult to obtain accurate distance information. In this case, the method can be switched to a method other than the phased array method (for example, a method of measuring a distance based on a time period from when one ultrasonic transducer oscillates an ultrasonic wave until when this ultrasonic transducer receives its reflection, as in an ultrasonic range finder).

Each of the distance information output units 30, 32, 34 is a bone-conduction speaker, is arranged to allow a vibration unit to be in contact with the head, and transmits output information to the user through voice, sound, or the like. The distance information output unit 30 on the right side and the distance information output unit 34 on the left side are embedded in a pair of temple portions 10b, 10c of the body 10, and are adapted to be in contact with the upper vicinity of the right ear and the upper vicinity of the left ear of the user, respectively. The distance information output unit 32 on the center is embedded in a bridge portion 10d of the body 10, and is adapted to be in contact with the upper vicinity of the nose of the user. The number of distance information output units 30, 32, 34 is not particularly limited, and may be one. However, a plurality of distance information output units is preferably provided in the left-right direction of the user to allow localization of ambient environment information. The distance information output units 30, 32, 34 may have a configuration for outputting air-conduction sound instead of bone-conduction sound, and may have a form of headphones, earphones, or the like. The distance information output units 30, 32, 34 may have a configuration for outputting distance information through tactile sensation, in addition to the configuration for outputting distance information through sound. As an example of the configuration for outputting distance information through tactile sensation, the distance information output units 30, 32, 34 each may be a vibration motor that generates vibration along with rotation of an eccentric rotor or the like, a piezoelectric vibration plate, or the like, and/or may have a configuration for transmitting distance information based on level of vibration. As another example of the configuration for outputting distance information through tactile sensation, the distance information output units 30, 32, 34 each may be a bag containing air, or the like, connected to a pressurizing pump via a valve, and/or may have a configuration for transmitting distance information through a compression force to be applied on the face or the like of the user by controlling the opening degree of the valve. As still another example of the configuration for outputting distance information through tactile sensation, the distance information output units 30, 32, 34 each may be an electrode or the like, and/or may have a configuration for transmitting distance information by providing an amount of electrical stimulation to the face or the like of the user. A large number of distance information output units 30, 32, 34 may be arranged in a row in the left-right direction of the user, and this configuration allows more fine localization of ambient environment information.

The control unit 40 includes a microprocessor including a central processing unit (CPU) and a memory. The control unit 40 is embedded in one of the temple portions of the body 10, and calculates distance information and the like on a target portion included in a distance image acquired by the distance image capturing unit 20 based on detection performed by the line-of-sight direction detection unit 22.

In addition to the above configuration, the ambient environment information transmission device 1 includes, in the body 10, a power supply unit (not illustrated) for operating the control unit 40 and the like, and an input unit (not illustrated) for turning on and off the power supply unit, switching an operation mode, and the like. The body 10 may further be provided with a six-axis acceleration sensor that measures a posture when being worn by the user, and this configuration allows reduction in a processing load on image processing.

Next, operation of the ambient environment information transmission device 1 with the above configurations will be described. When the ambient environment information transmission device 1 is operated in a state of being worn by a visually impaired person, the distance image capturing unit 20 captures a distance image ahead of the user. The control unit 40 can operate the projection unit 24 constantly during operation of the distance image capturing unit 20, to cause pattern light to be projected onto a target object. The projection unit 24 may be controlled to be operated only in a case where it is difficult for the distance image capturing unit 20 to capture a distance image, or may be operated based on user's operation of the input unit.

Figure 3:
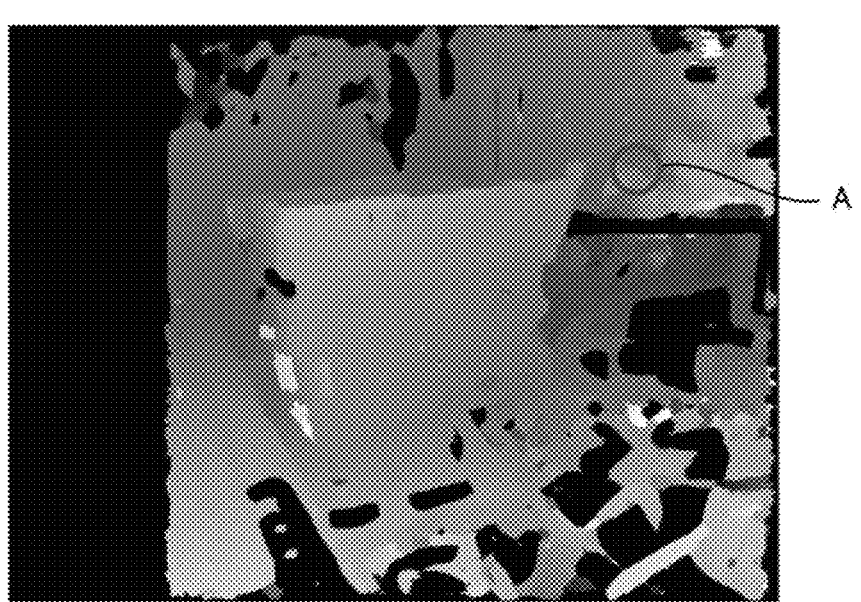
FIG. 3 is a diagram illustrating an example of a distance image.

FIG. 3 illustrates an example of a distance image captured by the distance image capturing unit 20. The shading in FIG. 3 represents differences in distances from the distance image capturing unit 20 to target objects, and brighter areas represent closer distances and darker areas represent farther distances. This distance image corresponds to a field of view for an able-bodied person.

When the user moves the line of sight, the control unit 40 identifies an area of interest A, in the distance image, that coincides with the line-of-sight direction, based on detection performed by the line-of-sight direction detection unit 22. Then, the control unit 40 obtains distance information on a target portion of an object corresponding to the area of interest A. The distance information on the target portion may be, for example, distance information on a center pixel of the area of interest A, or may be an average value of pieces of distance information on a plurality of pixels included in the area of interest A.

The control unit 40 causes the obtained distance information on the target portion to be output from the distance information output units 30, 32, 34. The output of the distance information can be made through a loudness of sound, pitch of sound, an audio language, or the like. For example, the volume can be reduced as the distance is farther, and the volume can be increased as the distance is closer. In a case where the distance information output units 30, 32, 34 have the configuration for performing transmission through tactile sensation (vibration, compression, electrical stimulation, or the like), the distance information can be output by changing strength of the tactile sensation, intervals of the tactile sensation, a pattern of the tactile sensation, or the like.

The control unit 40 causes a distance image to be captured and a line-of-sight direction to be obtained, successively at a predetermined cycle, and causes distance information on a target portion in the line-of-sight direction to be output in real time. The user can correctly acquire the distance information on the target portion simply by moving the line of sight, and thus the user can quickly and accurately grasp ambient environment information of interest.

In parallel with the obtaining of the distance information on the target portion using the distance image, the control unit 40 obtains distance information on the target portion based on detection performed by the ultrasonic transducers 26. This combination use of the ultrasonic transducers 26 enables reliable obtaining of the distance information on the target portion because there is a possibility that the distance information cannot be correctly obtained only through the distance image capturing unit 20 in a case where the target object is, for example, a transparent object such as a glass door, or an object made of a material having a high light reflecting property or a high light absorbing property.

The control unit 40 can localize output of distance information from the plurality of distance information output units 30, 32, 34 in the line-of-sight direction. For example, when a line-of-sight direction in a distance image focuses on the rightmost side, distance information is output only from the distance information output unit 30 on the right side. As the line-of-sight direction approaches the center, a ratio of output from the distance information output unit 32 on the center to output from the distance information output unit 30 on the right side is gradually increased. When the line-of-sight direction focuses on the center, the distance information is output only from the distance information output unit 32 on the center. When the line-of-sight direction focuses on the left side, a ratio of output between the distance information output unit 32 on the center and the distance information output unit 34 on the left side is controlled in a manner similar to that described above. As a result, the user can easily grasp, through sensation, the direction of a target portion for which the distance information has been obtained.

Figure 4:
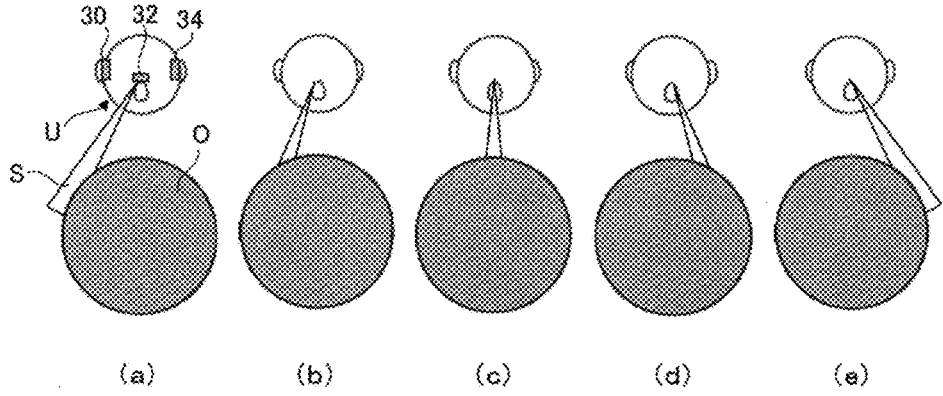
FIG. 4 is a schematic diagram for explaining an example of operation of the ambient environment information transmission device illustrated in FIG. 1.

FIG. 4 is a schematic diagram for explaining an example of the operation of the ambient environment information transmission device 1, and illustrates respective states, in parts (a) to (e) of FIG. 4, when a user U moves a line-of-sight direction S from the right side to the left side with respect to an object O. As illustrated in part (a) of FIG. 4, in a state where the line-of-sight direction S focuses on the rightmost side of the object O as viewed from the user, distance information is output only from the distance information output unit 30 on the right side of the user U.

As illustrated in part (b) of FIG. 4, when the line-of-sight direction S moves toward the left side of the user U, the output is also made from the distance information output unit 32 on the center in addition to the output from the distance information output unit 30 on the right side. Meanwhile, the ratio of the output from the distance information output unit 32 on the center gradually increases. The output information from the distance information output units 30, 32 also reflects distance information on a target portion that gradually becomes closer.

As illustrated in part (c) of FIG. 4, when the line-of-sight direction S moves to the center of the object O, the distance information is output only from the distance information output unit 32 on the center. When the line-of-sight direction S further moves toward the left side of the user U and enters the state illustrated in part (d) of FIG. 4, the ratio of the output from the distance information output unit 34 on the left side to the output from the distance information output unit 32 on the center gradually increases, and the output distance information gradually becomes information with a farther distance. As illustrated in part (e) of FIG. 4, in a state where the line-of-sight direction S focuses on the leftmost side of the object O as viewed from the user, the distance information is output only from the distance information output unit 34 on the left side. The user U can grasp the approximate size and shape of the object O from the movement of the line of sight described above to estimate what the object O is.

Figure 5:
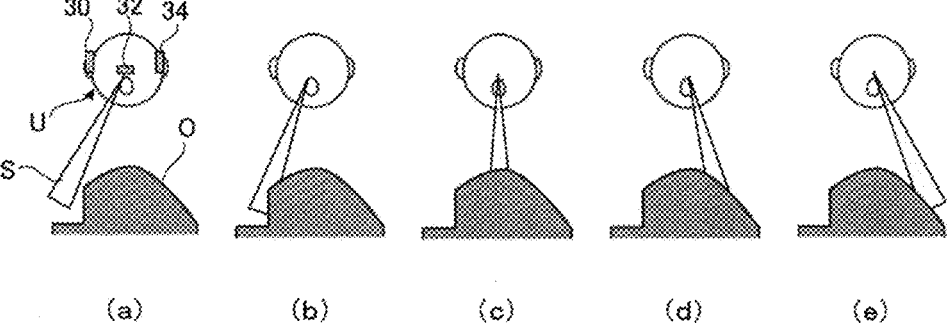
FIG. 5 is a schematic diagram for explaining another example of operation of the ambient environment information transmission device illustrated in FIG. 1.

The control unit 40 can cause level difference information to be output when detecting a level difference in the object O, in addition to the output of the distance information from the distance information output units 30, 32, 34. FIG. 5 is a schematic diagram for explaining an example of the operation of the ambient environment information transmission device 1 in a case where the object O has a level difference, and illustrates, similarly to FIG. 4, respective states, in parts (a) to (e) of FIG. 5, when the user U moves the line-of-sight direction S from the right side to the left side with respect to the object O. When the line-of-sight direction S is moved from the state illustrated in part (a) of FIG. 5, a change in distance information along with the movement of the line-of-sight direction S rapidly increases at the same time when the line-of-sight direction S passes over the level difference as illustrated in part (b) of FIG. 5.

When the change in the distance information along with the movement of the line-of-sight direction S exceeds a preset reference value, the control unit 40 causes level difference information for transmitting information on the presence of the level difference to the user to be output through predetermined voice, sound, or vibration, or the like. As a result, the user can more accurately grasp the shape, the arrangement, or the like of the object O. For example, an object or the like placed on a desk can be easily determined by a level difference present between the desk and the object. In the states, illustrated in part (a), and parts (c) to (e) of FIG. 5, where no level difference is present in the line-of-sight direction S, distance information is output from the distance information output units 30, 32, 34, similarly to the states illustrated in part (a), and parts (c) to (e) of FIG. 4. The level difference may be a stairstep, a level difference at an entrance porch, an edge of a station platform, or the like. When these level differences are present in the line-of-sight direction of the user, the level difference information can be accurately transmitted to the user. Note that the control unit 40 may be configured to also perform the transmission to the user regarding a level difference other than the level difference in the line-of-sight direction S in a manner distinguishable from the level difference in the line-of-sight direction S. In this case, for example, it is possible to output, through voice or the like, level difference information regarding a direction of the level difference and a distance to the level difference, such as "a level difference, in a direction of two o'clock, one meter away".

The level difference information is preferably output in a manner such that the user can distinguish between a case of rapid reduction in distance information and a case of rapid increase in the distance information. This makes it easier to grasp the shape of an object on the periphery of a level difference. For example, the output of the level difference information can be increased in a case of rapidly closer distance information, while the output of the level difference information can be reduced in a case of rapidly farther distance information. A reference value for the change in the distance information may be determined based on an absolute value of the change amount, or may be determined based on a ratio of the change amount to the distance information.

In FIG. 5, description has been made for the case where the line-of-sight direction S is moved in the left-right direction as an example. However, a level difference can be detected even when the line-of-sight direction S is moved in the vertical direction. This allows a correct grasp of a dangerous part such as a height difference or a stairstep.

Figure 6:
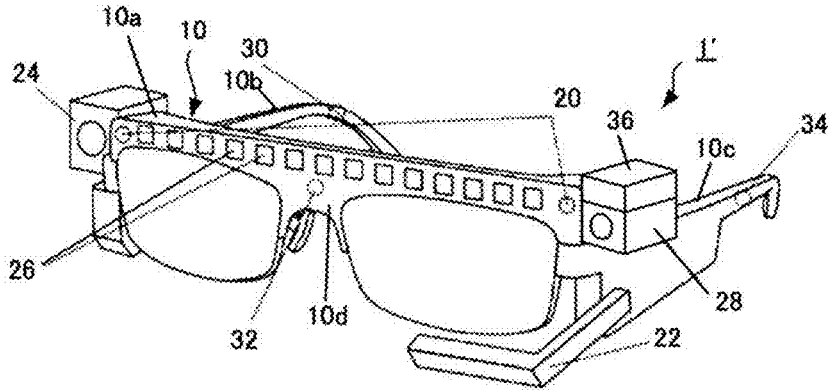
FIG. 6 is a perspective view of an ambient environment information transmission device according to another embodiment of the present invention.
Figure 7:
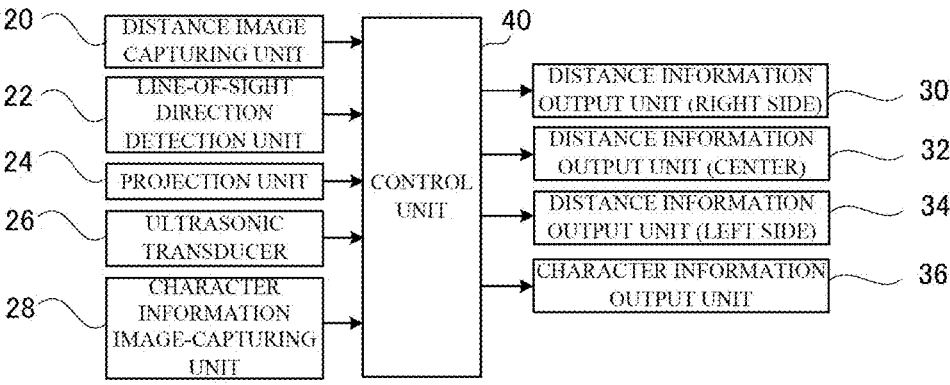
FIG. 7 is a block diagram of the ambient environment information transmission device illustrated in FIG. 6.

FIG. 6 is a perspective view of an ambient environment information transmission device according to another embodiment of the present invention, and FIG. 7 is a block diagram thereof. An ambient environment information transmission device 1' illustrated in FIGS. 6 and 7 is configured by adding a character information image-capturing unit 28 and a character information output unit 36 to the ambient environment information transmission device 1 illustrated in FIGS. 1 and 2. Other configurations of the ambient environment information transmission device 1' illustrated in FIGS. 6 and 7 are similar to those of the ambient environment information transmission device 1 illustrated in FIGS. 1 and 2. Therefore, in FIGS. 6 and 7, the components similar to those in FIGS. 1 and 2 are denoted by the same reference signs, and detailed description thereof is omitted.

The character information image-capturing unit 28 is supported on the left side of the rim portion 10a of the body 10 to capture an image in substantially the same direction as that of the distance image capturing unit 20, and captures an image of character information provided on an object in an image capturing area of the distance image capturing unit 20. The character information image-capturing unit 28 can preferably adopt, for example, a camera having resolution higher than that of the distance image capturing unit 20, such as a charge-coupled device (CCD) camera or a complementary metal-oxide semiconductor (CMOS) camera. The object provided with character information is not particularly limited, and examples thereof include a product package, a flyer, a poster, a signboard, a guideboard, a sign, and the like.

The character information output unit 36 is a speaker (air-conduction speaker) that outputs character information through voice, and is attached on the left side of the rim portion 10a of the body 10 in a manner integral with the character information image-capturing unit 28. Similarly to the distance information output units 30, 32, 34, the character information output unit 36 may be a bone-conduction speaker, or may have a configuration for outputting, by converting character information into a Morse code, a Braille code, or the like, the character information through tactile sensation such as vibration, compression, or electrical stimulation.

The control unit 40 obtains distance information on a target portion of an object corresponding to the area of interest A based on detection of a line-of-sight direction performed by the line-of-sight direction detection unit 22. Then, the control unit 40 causes the distance information to be output from the distance information output units 30, 32, 34, and sets a reading area in an image capturing area of the character information image-capturing unit 28 based on the distance information. The reading area is an area in which, when character information is present in the area of interest A, this character information and other character information highly related to this character information can be included. For example, the reading area can be set as one enclosed area by including each peripheral pixel whose absolute value of a difference of distance information with respect to reference distance information is equal to or less than a predetermined value when the distance information on the area of interest A is set as the reference distance information. Alternatively, as the reading area, an area may be set that includes peripheral pixels whose respective change rates of respective pieces of distance information in respective directions radially spreading from the area of interest A are equal to or less than a predetermined value.

The control unit 40 obtains all pieces of character information included in the set reading area, and causes the character information to be output from the character information output unit 36 through sound or tactile sensation. The character information can be obtained, for example, by performing known optical character recognition (OCR) processing on an image in the reading area. The OCR processing may be performed by the control unit 40, or may be performed by an external server via a network such as the Internet.

The ambient environment information transmission device 1' according to the present embodiment is configured to set a reading area in the image capturing area of the character information image-capturing unit 28 based on distance information in a line-of-sight direction, and to cause character information included in the reading area to be output from the character information output unit 36. Thus, it is possible to extract pieces of character information as a single collective unit in accordance with a distance to an area of interest, even in a case where a large number of objects provided with pieces of character information are present in the image capturing area of the character information image-capturing unit 28. Therefore, it is possible to reliably transmit, to a user, only the character information in which the user is interested. Note that image capturing data of the character information image-capturing unit 28 can also be used for purposes other than character reading, such as a complementing purpose of level difference detection, and an imaging record.

REFERENCE SIGNS LIST

1 ambient environment information transmission device
10 body
20 distance image capturing unit
22 line-of-sight direction detection unit
24 projection unit
26 ultrasonic transducer
28 character information image-capturing unit
30, 32, 34 distance information output unit
36 character information output unit
40 control unit

The invention claimed is:

1. An ambient environment information transmission device, comprising:
   a body configured to be worn by a user;
   a distance image capturing unit supported by the body, the distance image capturing unit being configured to capture a distance image ahead of a user;
   a line-of-sight direction detection unit supported by the body, the line-of-sight direction detection unit being configured to detect a line-of-sight direction of a user;
   a control unit configured to obtain distance information on a target portion in the line-of-sight direction in the distance image; and
   a distance information output unit configured to output the distance information through sound or tactile sensation, wherein
   the control unit is configured to cause level difference information to be output from the distance information output unit, when a change in the distance information along with movement of the line-of-sight direction exceeds a reference value.

2. The ambient environment information transmission device according to claim 1, wherein
   a plurality of the distance information output units is provided in a left-right direction of a user, and
   the control unit is configured to localize output from the plurality of the distance information output units in the line-of-sight direction.

3. The ambient environment information transmission device according to claim 1, further comprising a projection unit supported by the body, the projection unit being configured to project pattern light ahead of a user.

4. The ambient environment information transmission device according to claim 1, further comprising an ultrasonic transducer supported by the body, the ultrasonic transducer being configured to transmit and receive an ultrasonic wave to and from a side ahead of a user, wherein the control unit is configured to obtain the distance information on the target portion in the line-of-sight direction, based on detection performed by the ultrasonic transducer.

5. The ambient environment information transmission device according to claim 1, further comprising:
   a character information image-capturing unit configured to capture an image of character information provided on an object in an image capturing area of the distance image capturing unit; and
   a character information output unit configured to output the character information through sound or tactile sensation, wherein
   the control unit is configured to:
   set a reading area in an image capturing area of the character information image-capturing unit based on the distance information in the line-of-sight direction; and cause character information included in the reading area to be output from the character information output unit.

6. An ambient environment information transmission device, comprising:

a body configured to be worn by a user;

a distance image capturing unit supported by the body, the distance image capturing unit being configured to capture a distance image ahead of a user;

a line-of-sight direction detection unit supported by the body, the line-of-sight direction detection unit being configured to detect a line-of-sight direction of a user;

a control unit configured to obtain distance information on a target portion in the line-of-sight direction in the distance image; and a distance information output unit configured to output the distance information through sound or tactile sensation, wherein a plurality of the distance information output units is provided in a left-right direction of a user, and the control unit is configured to localize output from the plurality of the distance information output units in the line-of-sight direction.

7. The ambient environment information transmission device according to claim 6, further comprising a projection unit supported by the body, the projection unit being configured to project pattern light ahead of a user.

8. The ambient environment information transmission device according to claim 6, further comprising an ultrasonic transducer supported by the body, the ultrasonic transducer being configured to transmit and receive an ultrasonic wave to and from a side ahead of a user, wherein the control unit is configured to obtain the distance information on the target portion in the line-of-sight direction, based on detection performed by the ultrasonic transducer.

9. The ambient environment information transmission device according to claim 6, further comprising:

a character information image-capturing unit configured to capture an image of character information provided on an object in an image capturing area of the distance image capturing unit; and a character information output unit configured to output the character information through sound or tactile sensation, wherein the control unit is configured to:

set a reading area in an image capturing area of the character information image-capturing unit based on the distance information in the line-of-sight direction; and cause character information included in the reading area to be output from the character information output unit.

10. An ambient environment information transmission device, comprising:

a body configured to be worn by a user;

a distance image capturing unit supported by the body, the distance image capturing unit being configured to capture a distance image ahead of a user;

a line-of-sight direction detection unit supported by the body, the line-of-sight direction detection unit being configured to detect a line-of-sight direction of a user;

a control unit configured to obtain distance information on a target portion in the line-of-sight direction in the distance image;

a distance information output unit configured to output the distance information through sound or tactile sensation, a character information image-capturing unit configured to capture an image of character information provided on an object in an image capturing area of the distance image capturing unit; and a character information output unit configured to output the character information through sound or tactile sensation, wherein the control unit is configured to:

set a reading area in an image capturing area of the character information image-capturing unit based on the distance information in the line-of-sight direction; and cause character information included in the reading area to be output from the character information output unit.

11. The ambient environment information transmission device according to claim 10, further comprising a projection unit supported by the body, the projection unit being configured to project pattern light ahead of a user.

12. The ambient environment information transmission device according to claim 10, further comprising an ultrasonic transducer supported by the body, the ultrasonic transducer being configured to transmit and receive an ultrasonic wave to and from a side ahead of a user, wherein the control unit is configured to obtain the distance information on the target portion in the line-of-sight direction, based on detection performed by the ultrasonic transducer.

* * * * *